Nov. 9, 1954 N. SCHMITT 2,693,981
LOCATING TOOL
Filed Sept. 29, 1949
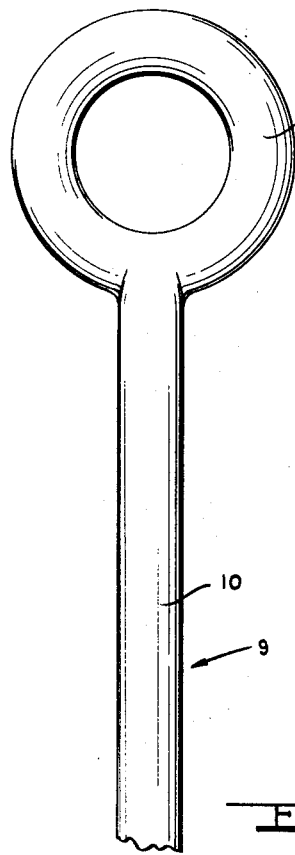
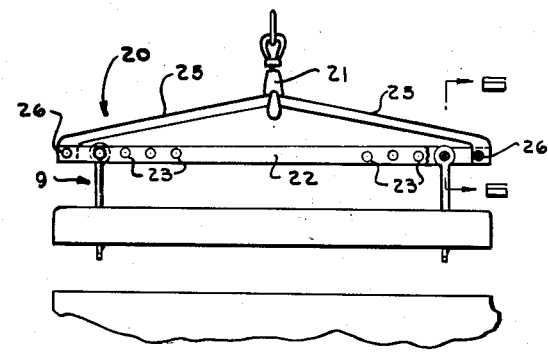
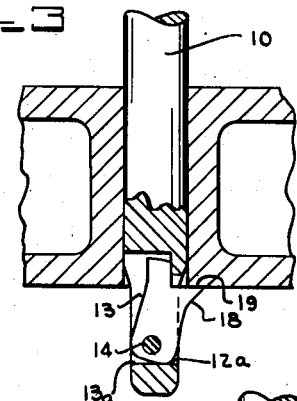
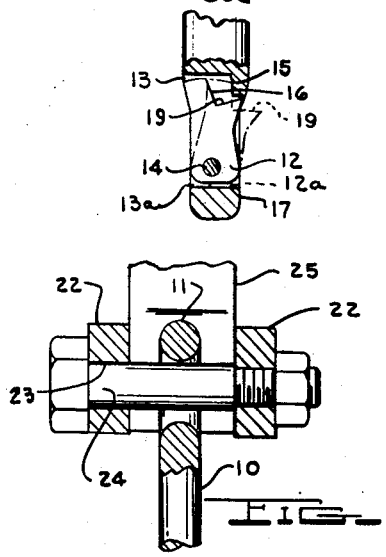
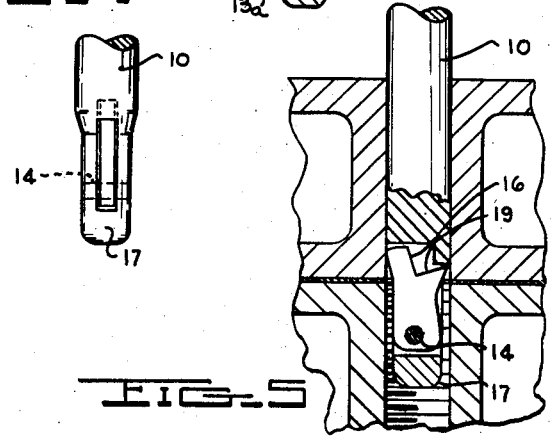
INVENTOR.
NICKOLAS SCHMITT
BY
*Arthur M. Smith*
ATTORNEY

United States Patent Office 2,693,981
Patented Nov. 9, 1954

2,693,981

LOCATING TOOL

Nickolas Schmitt, Wolverine, Mich.

Application September 29, 1949, Serial No. 118,547

4 Claims. (Cl. 294—97)

This invention relates to a locating tool particularly, but not exclusively, adapted for use in handling and assembling heavy parts which are to be accurately aligned to permit connecting studs or similar members to be inserted through aligned holes in the parts. Cylinder heads to be aligned in position on a motor block are one example of parts with which the present invention may be utilized.

The assembly of heavy parts, such as cylinder heads with motor blocks has been perviously both difficult and time-consuming. In assembly, a gasket must be placed between the parts. There are no protruding mating parts on either the head or block and thus the gasket must be held manually in accurate alignment during assembly. The head and block are drilled with holes through which the connecting studs extend. Normally the head is handled and lowered into position by means of a suitable hoisting mechanism. The head, block and gasket must be all in accurate alignment as the head is lowered onto the block, so that the connector studs can be inserted through the head and connected with the block. While it may appear that the head could be moved on the block for minor adjustment after it rests on the block, this is not feasible since such movement causes the gasket to move simultaneously out of alignment. Frequently, the gasket is damaged under these circumstances.

Cylinder heads are assembled with the block at the present time without any special hoisting and aligning tool. The gasket is positioned loosely on the block and the cylinder head is lowered thereonto, locating the parts by sight. During the assembly, the gasket frequently shifts upon initial contact with the cylinder head, usually requiring several trials, and a considerable period of time before suitable assembly of the parts can be completed.

Several prior attempts have been made to produce a suitable locating tool for this purpose, but these prior constructions usually employed as screw-threaded connection with the head and have been cumbersome, time-consuming and difficult to use. Such devices require much time for attachment and detachment and do not locate the parts with the stud holes in position. These tools accordingly, have been of little use for applicant's purpose.

The locating tool of the present invention not only serves to locate the cylinder head on the motor block, but also serves as a handling tool, being particularly suitable for attachment directly with a conventional hoisting mechanism. The present locating tool is automatically locked in assembled relation with the cylinder head and also is automatically released after the cylinder head has been accurately located on the motor block. The tool is preferably provided with an attachment for connection with a chain fall or similar device and is connected with the head by merely inserting the tool through a bore in the cylinder head. In this position a locating end of the tool extends below the lower surface of the head. A locking dog, pivotal within a slot in the tool, moves radially outward therefrom and engages the underside of the head to prevent retraction of the tool therefrom until accurately positioned on the motor block. In assembly, of the head with the motor block, the locating tool and head are lowered onto the block and the locating tip of the tool is directed through the opening in the gasket and into the threaded hole in the block. As the head and block come together with the axis of the bore aligned with the axis of the hole in the gasket and of the threaded hole in the block, the locking dog is cammed into the shaft of the tool by the threads on the block and releases the cylinder head automatically. The locating tool is then free to move axially out of the bore.

It is therefore, an object of the present invention to provide a locating tool which is particularly suitable for use in handling and in assembling mating parts, such as a cylinder head and a motor block.

Another object of this invention is to provide a highly efficient tool of the above type which may be quickly and easily attached or detached from a part such as a cylinder head and more particularly which is automatically locked upon insertion of the tool through a bore in the part and which is automatically released when the tool has accurately located the part on another part to which it is to be secured as by studs or the like.

Another object is to provide a locating tool adapted to extend through an opening in a cylinder head and having a locking dog movable outwardly from the shaft of the tool to engage the lower surface of the cylinder, the locking dog having a tapered camming surface adapted to engage the walls of a corresponding threaded hole in a motor block to move the dog into the shaft of the tool.

Another object of the invention is to provide a tool of the above type in which the upper portion of the camming surface is coincident with the portion engaging the cylinder head whereby the head is not released until the parts are in substantially assembled relation.

Still another object is to provide a tool having all of above features which is also extremely strong and which is characterized by simplicity of construction and which can be manufactured economically with a minimum of operations.

Other objects of this invention will appear in the following description and appended claims, reference being had to the accompanying drawings forming a part of this specification wherein like reference characters designate corresponding parts in the several views.

Fig. 1 is a front elevational view, partly in section, showing a locating tool embodying the features of the present invention.

Fig. 2 is an elevational view partly in section illustrating two of the tools shown in Fig. 1 secured to a chain fall and holding a cylinder head just prior to assembly with a motor block.

Fig. 3 is a sectional view showing the tool in locked position with the cylinder head.

Fig. 4 is a fragmentary side elevational view showing the locking dog in its inoperative position.

Fig. 5 is a sectional view illustrating the locating tool just subsequent to the location of the cylinder head shown in Fig. 3 upon a motor block and also illustrating the locating tip of the tool extending into the threaded hole in the motor block.

Fig. 6 is a sectional view taken substantially on the line 6—6 of Fig. 2.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the embodiment of the invention shown in the drawings and with particular reference to Figures 1 and 4 the locating tool 9 comprises a cylindrical shaft 10 having an attaching eye or ring 11 on one end. At the other end of the shaft a locking dog 12 is provided which is pivotally movable within the slotted opening 13 in the shaft about the pivot pin 14. The latter pin is eccentrically positioned so that the locking dog 12 normally falls outwardly by gravity into its operative position, shown in broken lines in Figure 1. When in the operative position, the bottom portion 12a of the dog 12 contacts the bottom surface 13a of the slotted opening 13 to provide a positive support which assists in carrying the load imposed on the dog 12 when in its load carrying position as shown in Fig. 3.

The outward radial movement of the locking dog is limited by the engaging lug 15 provided by the shaft 10 and a corresponding engaging lug 16 extending upwardly from the locking dog 12.

The lower end 17 and the shaft 10 is provided with a reduced diameter corresponding to the minor thread diameter of the bolt having a diameter similar to the diameter of the shaft 10. As shown in the drawings, the outer surface of the dog 12 follows the general contour of the lower portion of the shaft so that the bottom end of the dog may move into the threaded hole during assembly of the parts. (See Fig. 5.) As shown, the dog 12 is provided with a tapered camming surface 18 adjacent the abutment face 19, and having the upper portion of the camming surface coincident with the abutment face. By such construction, the cylinder head may be lowered substantially onto the motor block to accurately position the parts prior to wholly releasing the cylinder head. In addition, the gasket is engaged by the locating end of the tool and is accurately and rigidly held in the desired position during the assembly operation.

Preferably two locking tools 9 are employed in assembling the cylinder head, as shown particularly in Figures 2 and 6. These tools extend through an adaptor member 20 which is suitably secured to the hoisting mechanism 21. The adaptor is provided with a pair of spaced plates 22, each provided with a plurality of longitudinally spaced bores 23 to provide adjustment for the shoulder bolts 24 to accommodate for various spacings of the conventional motor block assemblies, generally spaced approximately ½ inch apart. Each of the shoulder bolts 24 is adapted to extend through the eye in the locking tool 9 and support the same between the plates 22. The crossbar 25 has the ends thereof extending between and spacing the plates 22 and is rigidly secured thereto by rivets 26.

From the foregoing it is believed apparent that the locating tool of the present invention provides a convenient, quick and efficient means for attachment of the hoisting mechanism to a part, such as a cylinder head. Of equal importance, the disclosed tool provides for accurate location of mating parts, such as a cylinder head and a motor block with a gasket therebetween and assures accurate alignment of the gasket during assembly. Damage to the gasket is virtually eliminated with the present locating tool. In addition, the tool disclosed herein is composed of a minimum numbers of parts, each of which is very simple, sturdy, and compact and accordingly the tool is well adapted for economical manufacture.

Having thus described my invention, I claim:

1. A locating tool for accurately positioning a cylinder head on a motor block with a gasket therebetween wherein the corresponding bores in the head and gasket are in accurate alignment with the threaded holes in the block, said locating tool comprising a cylindrical shaft having a reduced diameter locating end portion adapted to extend into the bore in the gasket and the threaded hole in the block, said locating end portion having a transverse longitudinally extending slot therein; and a free moving locking dog pivotally secured to said shaft within said slot about an eccentric pivot axis whereby said dog is normally urged by gravity only toward its engaged position, said locking dog having a substantially flat engaging face extending beyond the periphery of said shaft in the engaged position of said dog which engaging face is adapted to engage the lower surface of said cylinder head, said locking dog also having a downwardly and inwardly extending camming surface above said pivot axis adapted to engage the inner periphery of the threaded hole in the motor block to pivot said dog, thereby to move said engaging face into the recess in said shaft to release the cylinder head, the upper portion of said camming surface being terminated at a substantially pointed union with said engaging face whereby the head is not released until the head and block are in substantially assembled relation.

2. A locating tool as claimed in claim 1 wherein the locking dog is shaped so that it will fit entirely within the confines of the slotted shaft in the retracted position.

3. A locating tool for accurately positioning a first part on a second part, said parts having holes which are aligned in the assembled position thereof, comprising a cylindrical shaft with a locating end portion, said locating end portion having a transverse longitudinally extending slot therein, and a free moving locking dog pivotally secured to said shaft within said slot about an eccentric pivot axis whereby said dog is normally urged by gravity only toward its engaged position, said locking dog having a substantially flat engaging face extending beyond the periphery of said shaft in the engaged position of said dog which engaging face is adapted to engage the lower surface of said first part, said locking dog also having a downwardly and inwardly extending camming surface above said pivot axis which is adapted to engage the inner periphery of the hole in the second part to pivot said dog, thereby to move said engaging face into the recess in said shaft to release the first part, the upper portion of said camming surface being terminated at a substantially pointed union with said engaging face whereby the first part is not released until the first and second parts are in substantially assembled relation.

4. A locating tool as claimed in claim 3 wherein the locking dog is shaped so that it will fit entirely within the confines of the slotted shaft in the retracted position.

References Cited in the file of this patent

UNITED STATES PATENTS

| Number | Name | Date |
|---|---|---|
| 44,321 | Laly | Sept. 20, 1864 |
| 624,969 | Peterson | May 16, 1899 |
| 1,009,461 | Bakken | Nov. 21, 1911 |
| 1,084,995 | Wood | Jan. 20, 1914 |
| 1,179,924 | Howell | Apr. 18, 1916 |
| 1,340,470 | Whitmore | May 18, 1920 |
| 1,349,344 | O'Neill | Aug. 10, 1920 |
| 1,517,883 | Alleman | Dec. 2, 1924 |
| 1,521,381 | McPherson | Dec. 30, 1924 |
| 1,540,566 | Petree | June 2, 1925 |
| 1,659,992 | Crone | Feb. 21, 1928 |
| 1,921,379 | Bailey | Aug. 8, 1933 |
| 1,805,138 | Fredendall | May 12, 1937 |
| 2,155,620 | Scaramucci | Apr. 25, 1939 |

FOREIGN PATENTS

| Number | Country | Date |
|---|---|---|
| 556,018 | France | July 10, 1923 |